(No Model.)

J. S. COPELAND.
WHEEL FOR VEHICLES.

No. 574,194.  Patented Dec. 29, 1896.

Attest:
A. N. Jesbera.
Chas. E. Epworth.

Inventor:
James S. Copeland
by Redding & Kiddle
Attys.

THE NORRIS PETERS CO., PHOTO-LITHO., WASHINGTON, D. C.

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

WHEEL FOR VEHICLES.

SPECIFICATION forming part of Letters Patent No. 574,194, dated December 29, 1896.

Application filed January 15, 1896. Serial No. 575,650. (No model.)

*To all whom it may concern:*

Be it known that I, JAMES S. COPELAND, a citizen of the United States, residing in the city and county of Hartford, State of Connecticut, have invented certain new and useful Improvements in Wheels for Vehicles, of which the following is a specification, reference being had to the accompanying drawings, forming a part hereof.

This invention relates to the construction of the hubs and bearings of vehicle-wheels, and more especially to the construction of hubs and bearings for wheels which are adapted for use in velocipedes and in other vehicles of like description in which both lightness and strength are desired. Usually each of the main parts or members of the hubs and bearings of such wheels are drop-forged in one piece or are worked up from a thick and heavy piece of tubing, with the result that the finished part is unnecessarily heavy by reason of the weight of metal at points where it is not required for strength.

It is the object of this invention to so improve the construction of such hubs and bearings as to enable them to be made very light without sacrificing the strength, and also to enable them to be made much more cheaply than is possible by the methods above referred to.

A further object of the invention is to so construct and arrange the parts as to enable dust to be much more effectually excluded than is possible with the ordinary construction.

The features of construction wherein the improvement particularly resides will be fully described and explained hereinafter with reference to the accompanying drawings, in which—

Figure 2:
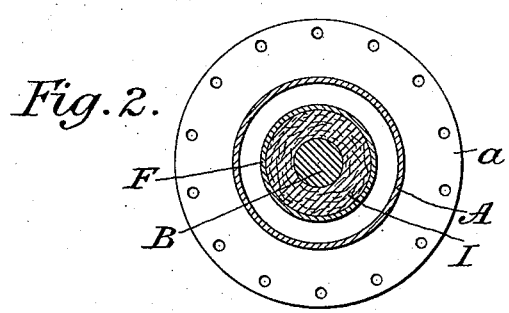
Figure 1:
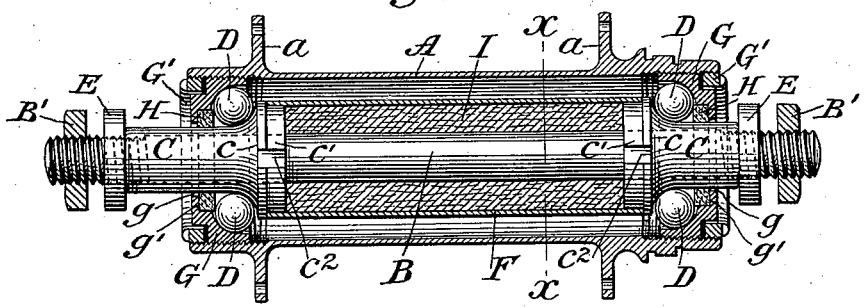
Figure 3:
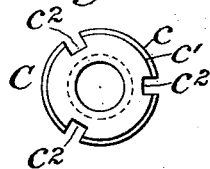

Figure 1 is a view, partly in longitudinal central section and partly in side elevation, of the hub and bearings of the rear wheel of a bicycle constructed in accordance with my invention. Fig. 2 is a section on the plane indicated by the line $x\,x$ of Fig. 1, and Fig. 3 is an end elevation of one of the bearing-sleeves hereinafter referred to.

The barrel or sleeve A, which is provided with flanges $a\,a$ for the attachment of the spokes, (not shown,) is represented as made in one piece, but it may be formed in any suitable manner, as shown, for example, in another application for Letters Patent of the United States filed by me January 2, 1896, and serially numbered 573,994. The usual fixed shaft B is threaded at its ends to receive the usual clamping-nuts B' B', by which it is secured as usual in the toe-pieces of the rear frame of a bicycle or, it might be, in the front fork in case the improvements are applied to the front wheel. Upon each end of the shaft B is slipped loosely a short bearing-sleeve C, which is preferably a drop-forging and is formed with the cones $c\,c$, which form one set of bearings for the balls D D. These sleeves are suitably proportioned according to their relative location and are adapted to form abutments for the toe-pieces of the frame or for the interposed washers E E, and are themselves held apart and supported rigidly in position by the coöperation of a short section of light tubing F, which is received upon suitable seats $c'\,c'$, formed upon the inner ends of the sleeves C C. The tube F and the sleeves C C may be fitted together tightly or they may be brazed together; but in any case they are held firmly together when the wheel is in position in the vehicle by the clamping-nuts upon the opposite ends of the shaft B. The ball-bearing cases G G are screw-threaded into the ends of the barrel A and are secured in position by the usual screw-threaded locking-rings G' G'. As the sleeves C C, having the cones $c\,c$ formed thereon, are disposed with their large ends inward, it will be evident that the aperture $g$ of each bearing-case G requires only to be of such diameter as to permit the ring or case to pass freely over the portion of the sleeve C of the least diameter, whereby the area of the annular space between such portion of the sleeve and the proximate edge of the bearing-case is much less than when the cones are placed in reverse position upon the shaft, and therefore is much less liable to admit dust. Furthermore, this arrangement permits a seat $g'$ to be formed in the bearing-case G for the reception of a felt ring H, which still further excludes dust.

The space between the shaft B and the shell or tube F affords a convenient chamber or receptacle for a mass of felt, waste, or similar absorbent material I, which will hold a charge of oil sufficient for a long period of time, the oil passing outward to the ball-bearings through channels $c^2$, milled in the cones $c\ c$.

It will be evident that the sleeves C C can be produced at a very slight expense, as well as the tube F, and that the latter, while being amply strong for whatever strains it may be subjected to, can be made very light and avoids altogether any increase of weight due to the presence of unnecessary metal. Moreover, all of the parts are easily and quickly assembled, and the cost of producing wheels which embody the described improvement as compared with the cost of producing wheels for like purposes as heretofore constructed is reduced to a minimum.

What I claim, and desire to secure by Letters Patent, is—

In a wheel for vehicles, the combination of a fixed shaft, short bearing-sleeves mounted upon said shaft, a tube interposed between said sleeves and supported thereby and forming a chamber about said shaft, a mass of absorbent material in said chamber, said sleeves having channels to permit the outward passage of the oil from said mass of absorbent material, means to clamp said tube and sleeves together longitudinally, a barrel adapted for the attachment of the spokes of the wheel, and bearing devices interposed between said barrel and sleeves, substantially as shown and described.

This specification signed and witnessed this 6th day of January, A. D. 1896.

JAMES S. COPELAND.

In presence of—
FELTON PARKER,
THOS. FOX.